US012427083B1

(12) United States Patent
Chen

(10) Patent No.: US 12,427,083 B1
(45) Date of Patent: Sep. 30, 2025

(54) TELESCOPIC SOFT SILICA GEL MASTURBATION CUP

(71) Applicant: Liang Chen, Shenzhen (CN)

(72) Inventor: Liang Chen, Shenzhen (CN)

( * ) Notice: Subject to any disclaimer, the term of this patent is extended or adjusted under 35 U.S.C. 154(b) by 0 days.

(21) Appl. No.: 18/938,787

(22) Filed: Nov. 6, 2024

(51) Int. Cl.
*A61H 19/00* (2006.01)
*A61H 23/02* (2006.01)

(52) U.S. Cl.
CPC ......... *A61H 19/32* (2013.01); *A61H 23/0218* (2013.01); *A61H 2201/1654* (2013.01); *A61H 2201/1669* (2013.01); *A61H 2201/1692* (2013.01); *A61H 2201/5007* (2013.01)

(58) Field of Classification Search
None
See application file for complete search history.

(56) References Cited

U.S. PATENT DOCUMENTS

| | | | | |
|---|---|---|---|---|
| 11,833,100 B1* | 12/2023 | Liu | A61H 9/0057 |
| 2002/0107431 A1* | 8/2002 | More | A61H 19/32 600/38 |
| 2022/0296459 A1* | 9/2022 | Jin | A61H 19/34 |
| 2024/0216214 A1* | 7/2024 | Duan | A61H 19/32 |

FOREIGN PATENT DOCUMENTS

| | | | |
|---|---|---|---|
| CN | 109223496 A | 1/2019 |
| CN | 114886751 A | 8/2022 |
| CN | 218979687 U | 5/2023 |

* cited by examiner

*Primary Examiner* — LaToya M Louis
(74) *Attorney, Agent, or Firm* — George D. Morgan

(57) ABSTRACT

A telescopic soft silica gel masturbation cup is disclosed, which includes a housing assembly made of a soft silica gel material, where the housing assembly includes an outer housing and a massage body which are integrally formed, and the massage body is a strip-shaped hollow cavity and is arranged in the outer housing; a support assembly detachably arranged in the housing assembly; a transmission assembly arranged in the support assembly; a first magnetic attraction assembly in transmission connection with the transmission assembly; and a second magnetic attraction assembly fixedly connected to the massage body and detachably connected to the first magnetic attraction assembly in a magnetic attraction manner. According to the telescopic soft silica gel masturbation cup provided by the present invention, the transmission assembly and the massage body are fixedly connected through the magnetic attraction effect of the two magnetic attraction pieces.

20 Claims, 7 Drawing Sheets

TELESCOPIC SOFT SILICA GEL MASTURBATION CUP

TECHNICAL FIELD

The present invention relates to the technical field of adult products, and in particular, to a telescopic soft silica gel masturbation cup.

BACKGROUND

With the development of economy and progress of the society, the heavy and busy fast pace makes men's working pressure greater, and therefore, alleviating daily working pressure has become a necessity and a social consensus. Various electric appliances are increasingly developing in the direction of alleviating working pressure, being convenient to use, being safe and efficient, etc., and a masturbation cup, as an important member among the electric appliances of people's live, is no exception. At present, an existing telescopic masturbation cup is configured to drive a gear to rotate in a variable direction through rotation of a drive motor, and the gear is connected to a shaft with a spiral track. Through contact of the shaft, the gear moves along the spiral track to generate an up-down telescopic action. The existing masturbation cup is complex in structure, has the defects that noise is large and faults are prone to occurring, and the existing masturbation cup is simple in appearance and cannot meet the increasing requirements of users. Therefore, a telescopic soft silica gel masturbation cup is provided to solve the above problems.

SUMMARY

An objective of the present invention is to provide a telescopic soft silica gel masturbation cup, so as to solve problems that an existing masturbation cup is complex in structure and relatively simple in appearance.

A telescopic soft silica gel masturbation cup provided by the present invention can be implemented through the following technical solution:

a telescopic soft silica gel masturbation cup provided by the present invention includes a housing assembly made of a soft silica gel material, where the housing assembly includes an outer housing and a massage body which are integrally formed, the outer housing is a hollow cavity, and the massage body is a strip-shaped hollow cavity and is arranged in the outer housing; a support assembly detachably arranged in the housing assembly, where the massage body is movably arranged in the support assembly in a penetrating manner; a transmission assembly arranged in the support assembly; a first magnetic attraction assembly in transmission connection with the transmission assembly, where the transmission assembly drives the first magnetic attraction assembly to perform reciprocating telescopic movement in the support assembly; and a second magnetic attraction assembly fixedly connected to the massage body and detachably connected to the first magnetic attraction assembly in a magnetic attraction manner, where the transmission assembly sequentially passes through the first magnetic attraction assembly and the second magnetic attraction assembly to drive the massage body to perform reciprocating telescopic movement in the support assembly.

In an embodiment, two opposite ends of the outer housing are respectively provided with a first through hole and a second through hole in a penetrating manner, the support assembly is mounted in the outer housing through the first through hole, and the second through hole is in communication with the massage body.

In an embodiment, an outer side of the outer housing is provided with a plurality of convex ribs, and the plurality of convex ribs and the outer housing are integrally formed.

In an embodiment, an accommodating cavity is arranged in the massage body, and the accommodating cavity is in communication with the second through hole; and a plurality of massage pieces are arranged on an inner wall of the accommodating cavity.

In an embodiment, the plurality of massage pieces and the massage body are integrally formed; and the massage pieces are convex points or spiral strips.

In an embodiment, a shape of the outer housing and the second through hole on the same side is a buttock shape or a human head shape.

In an embodiment, the support assembly comprises a support cavity, the support cavity is a hollow cavity with openings at two ends, and the massage body is movably arranged in the support cavity in a penetrating manner; a cover plate fixedly arranged on the support cavity, and the cover plate is arranged opposite to the massage body; and a clamping plate fixedly arranged on the cover plate, and a clamping groove is arranged between the cover plate and the clamping plate.

In an embodiment, a plurality of fixed columns are respectively arranged on a side, opposite to the cover plate, of the support cavity; and a plurality of second fixed holes are arranged on the cover plate in a penetrating manner, and positions of the plurality of second fixed holes are matched with the positions of corresponding fixed columns, respectively.

In an embodiment, a first connector is fixedly arranged at one end, opposite to the clamping plate, of the cover plate; and a clamping hole penetrates through the clamping plate, and the clamping hole is fixedly arranged on the first connector.

In an embodiment, the transmission assembly includes a fixed housing, the fixed housing is fixedly arranged in the support cavity; a drive motor arranged in the fixed housing, and a rotating shaft of the drive motor penetrates through the fixed housing; a transmission rod mechanism in transmission connection with the rotating shaft of the drive motor, and the transmission rod mechanism is in transmission connection with the first magnetic attraction assembly; and at least one guide rod slidably arranged on an outer side of the fixed housing and connected to the first magnetic attraction assembly, and the guide rod conducts guide operation on the reciprocating telescopic movement of the first magnetic attraction assembly.

In an embodiment, the fixed housing is a hollow cavity, at least one guide sleeve is arranged on the outer side of the fixed housing, and the at least one guide rod is slidably arranged in the corresponding guide sleeve, respectively.

In an embodiment, the transmission rod mechanism includes a first transmission rod and a second transmission rod which are in transmission connection; one end of the first transmission rod is in transmission connection with the rotating shaft of the drive motor; and the second transmission rod is in transmission connection with the first magnetic attraction assembly.

In an embodiment, the first magnetic attraction assembly includes a first magnetic attraction housing, and the first magnetic attraction housing is in transmission connection with the second transmission rod; and a first magnetic attraction piece fixedly arranged in the first magnetic attraction housing, and the first magnetic attraction piece is detachably connected to the second magnetic attraction assembly in a magnetic attraction manner.

In an embodiment, a connecting hole is arranged on a side, opposite to the guide rod, of the first magnetic attraction housing, and one end of the guide rod is fixedly connected into the connecting hole in a threaded manner.

In an embodiment, a side edge of the first magnetic attraction housing is provided with a second connector, and the second transmission rod is in transmission connection with the second connector.

In an embodiment, the second magnetic attraction assembly includes a second magnetic attraction housing, and the second magnetic attraction housing is fixedly connected to one end of the massage body; and a second magnetic attraction body fixedly arranged in the second magnetic attraction housing, and the second magnetic attraction body is detachably connected to the first magnetic attraction piece in a magnetic attraction manner.

In an embodiment, both the first magnetic attraction piece and the second magnetic attraction body are strong magnets.

In an embodiment, the telescopic soft silica gel masturbation cup provided by the present invention further includes a circuit board, a battery assembly, a key assembly and a charging assembly, where the circuit board and the battery assembly are fixedly arranged in the support assembly, respectively, and the circuit board is electrically connected to the transmission assembly, the battery assembly, the key assembly and the charging assembly, respectively; and the key assembly and the charging assembly are respectively arranged on the circuit board and respectively penetrate through the support assembly.

In an embodiment, the battery assembly adopts a polymer lithium ion battery.

In an embodiment, the charging assembly adopts one or more of a DC charging interface, a Type C charging interface, a Micro USB charging interface, and a Lightning charging interface.

Compared with the prior art, beneficial effects of the telescopic soft silica gel masturbation cup provided by the present invention are as follows:

According to the telescopic soft silica gel masturbation cup provided by the present invention, the transmission assembly and the massage body are fixedly connected through the magnetic attraction effect of the two magnetic attraction pieces, then the transmission assembly sequentially passes through the first magnetic attraction assembly and the second magnetic attraction assembly to drive the massage body to perform reciprocating telescopic movement in the support assembly, and therefore telescopic massage operation is realized. The structure of the masturbation cup is relatively simple, so that the problem that an existing masturbation cup is complex in structure is effectively solved, and the masturbation cup has advantages of being small in noise and not prone to failure. Meanwhile, the housing assembly is made of a soft silica gel material, and the shape of the outer housing is a buttock shape or a human head shape, thereby improving visual impact feeling of a user to a certain extent, effectively resolving the problem that an existing masturbation cup is relatively simple in appearance, and also improving user experience and satisfaction to a certain extent.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. A person of ordinary skill in the art may still derive other related drawings from these accompanying drawings without creative efforts.

Figure 1:
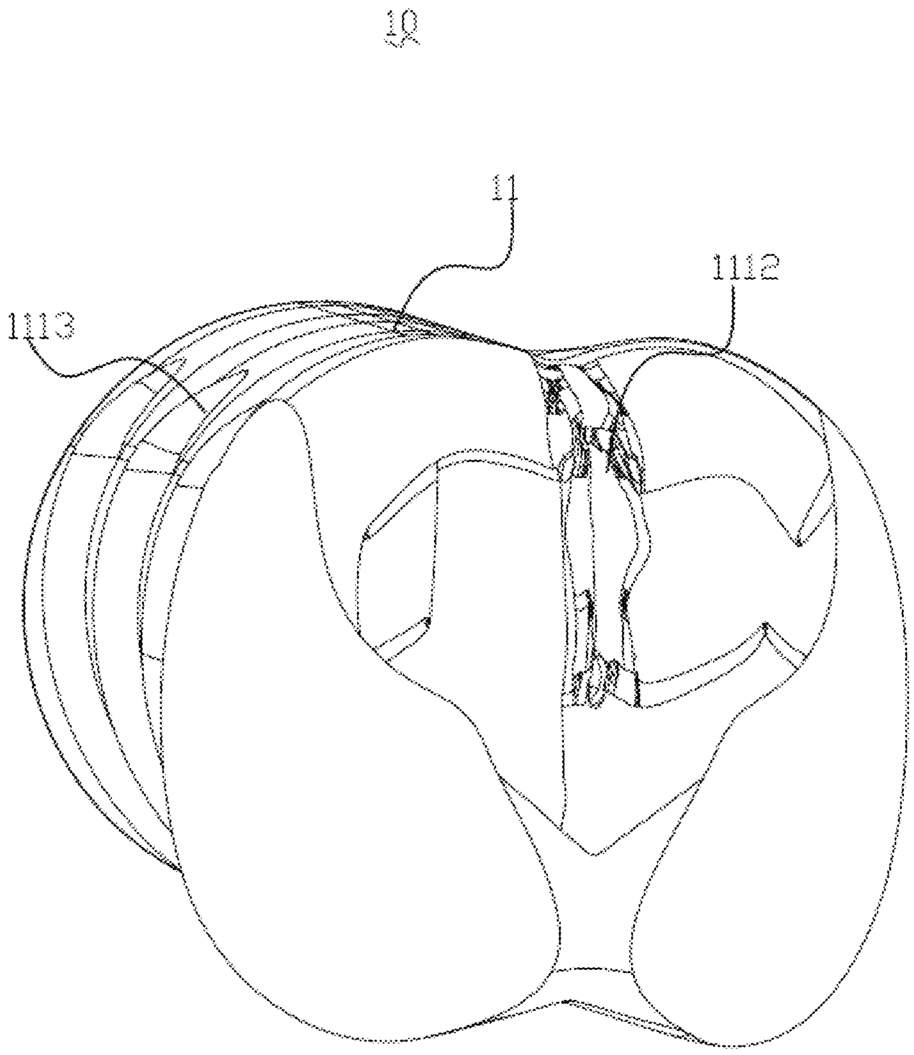
FIG. 1 is a schematic structural diagram of a telescopic soft silica gel masturbation cup according to the present invention.

In the figures: 10. telescopic soft silica gel masturbation cup; 11. housing assembly; 111. outer housing; 1111. first through hole; 1112. second through hole; 1113. convex rib; 112. massage body; 1121. accommodating cavity; 1122. massage piece; 12. support assembly; 121. support cavity; 1211. fixed column; 1212. first fixed hole; 122. cover plate; 1221. first connector; 1222. third through hole; 1223. second fixed hole; 123. clamping plate; 1231. clamping hole; 124. clamping groove; 13. circuit board; 14. transmission assembly; 141. fixed housing; 1411. guide sleeve; 1412. fixed sleeve; 142. drive motor; 143. transmission rod mechanism; 1431. first transmission rod; 1432. second transmission rod; 144. guide rod; 15. first magnetic attraction assembly; 151. first magnetic attraction housing; 1511. fixed cavity; 1512. connecting hole; 1513. second connector; 152. first magnetic attraction piece; 16. second magnetic attraction assembly; 161. second magnetic attraction housing; 162. second magnetic attraction body; 17. battery assembly; 18. key assembly; 19. charging assembly.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. Components of the embodiments of the present invention described and illustrated in the accompanying drawings can be arranged and designed in various different configurations.

Therefore, the detailed description of the embodiments of the present invention provided in the accompanying drawings is not intended to limit the scope of the claimed invention, but only to represent selected embodiments of the present invention. Based on the embodiments in the present invention, all other embodiments obtained by those of ordinary skill in the art without making creative labor fall within the scope of protection of the present invention.

Referring to FIG. 1 to FIG. 4, a telescopic soft silica gel masturbation cup 10 provided by the present invention mainly includes a housing assembly 11, a support assembly 12, a circuit board 13, a transmission assembly 14, a first magnetic attraction assembly 15, a second magnetic attraction assembly 16, a battery assembly 17, a key assembly 18, and a charging assembly 19. The housing assembly 11 is made of a soft silica gel material and includes an outer housing 111 and a massage body 112 which are integrally formed. The outer housing 111 is a hollow cavity, and the massage body 112 is a strip-shaped hollow cavity and is arranged in the outer housing 111. Preferably, the material of the housing assembly 11 is silica gel. The support assembly 12 is detachably arranged in the housing assembly 11 and supports the housing assembly 11. The circuit board 13, the transmission assembly 14, the battery assembly 17 are respectively arranged in the support assembly 12, and the circuit board 13 is electrically connected to the transmission assembly 14, the battery assembly 17, the key assembly 18, and the charging assembly 19, respectively. The transmission assembly 14 is in transmission connection with the first magnetic attraction assembly 15 and drives the first magnetic attraction assembly 15 to move in the support assembly 12. The battery assembly 17 provides electric energy for the circuit board 13 and the transmission assembly 14, respectively. One end of the second magnetic attraction assembly 16 is fixedly connected to the massage body 112, and the other end of the second magnetic attraction assembly is detachably connected to the first magnetic attraction assembly 15 in a magnetic attraction manner. The transmission assembly 14 sequentially passes through the first magnetic attraction assembly 15 and the second magnetic attraction assembly 16 to drive the massage body 112 to perform reciprocating telescopic movement in the support assembly 12. The key assembly 18 and the charging assembly 19 are respectively arranged on the circuit board 13 and respectively penetrate through the support assembly 12, the switch and function setting of the telescopic soft silica gel masturbation cup 10 are controlled by using the key assembly 18, and the battery assembly 17 is charged by using the charging assembly 19.

Referring to FIG. 1 to FIG. 4, a shape of one end of the outer housing 111 is a buttock shape or a human head shape. In this embodiment, two opposite ends of the outer housing 111 are respectively provided with a first through hole 1111 and a second through hole 1112 in a penetrating manner, the support assembly 12 is mounted in the outer housing 111 through the first through hole 1111, and the second through hole 1112 is in communication with the massage body 112. A shape of the outer housing 111 and the second through hole 1112 on the same side is a buttock shape. An outer side of the outer housing 111 is provided with a plurality of convex ribs 1113, and the plurality of convex ribs 1113 are in contact connection with a hand of a user, so that friction force between the convex ribs and the hand of the user is increased. Specifically, the plurality of convex ribs 1113 and the outer housing 111 are integrally formed. In this embodiment, an iron block is arranged at one end, opposite to the second magnetic attraction assembly 16, of the massage body 112, and the massage body is fixedly connected to the second magnetic attraction assembly 16 in a magnetic attraction manner through the iron block. An accommodating cavity 1121 is arranged in the massage body 112, and the accommodating cavity is in communication with the second through hole 1112. A plurality of massage pieces 1122 are arranged on an inner wall of the accommodating cavity 1121, and the plurality of massage pieces 1122 perform sliding massage operation. Specifically, the massage pieces 1122 are convex points or spiral strips and are integrally formed with the massage body 112.

Figure 2:
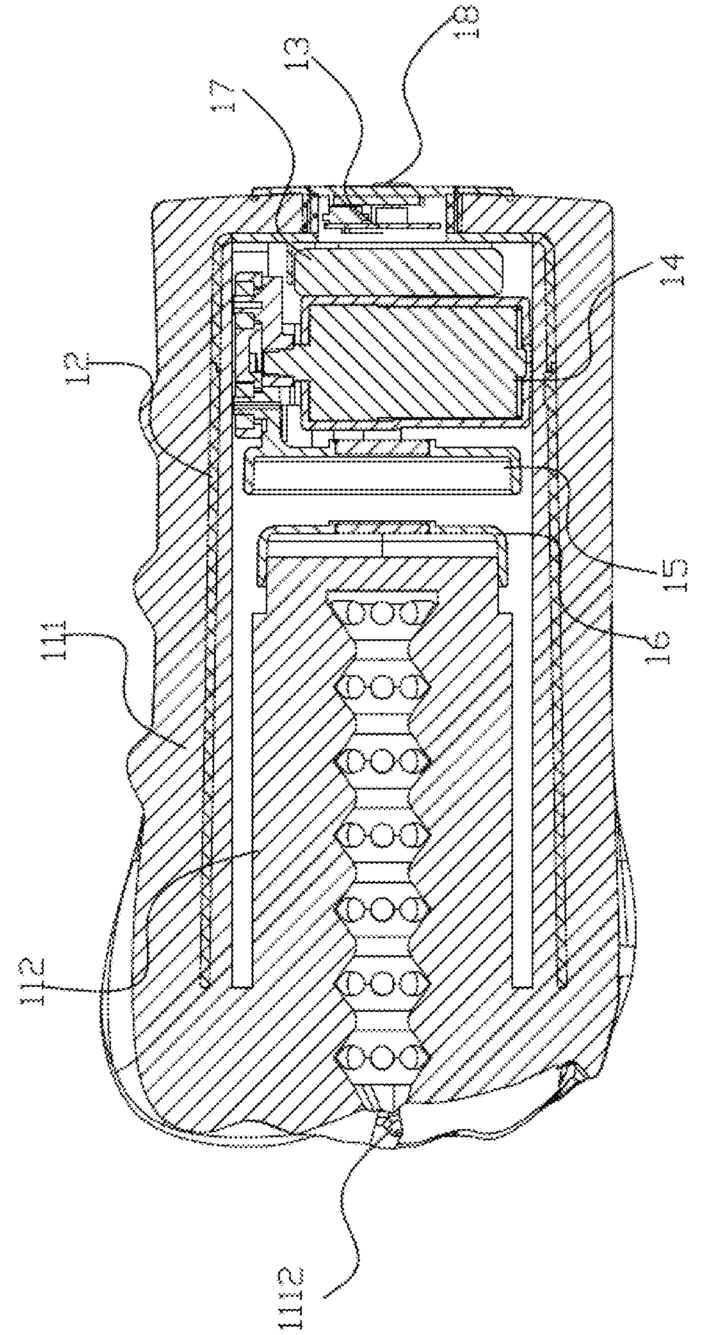
FIG. 2 is a schematic diagram of a cross-sectional structure of a telescopic soft silica gel masturbation cup according to the present invention shown in FIG. 1.
Figure 3:
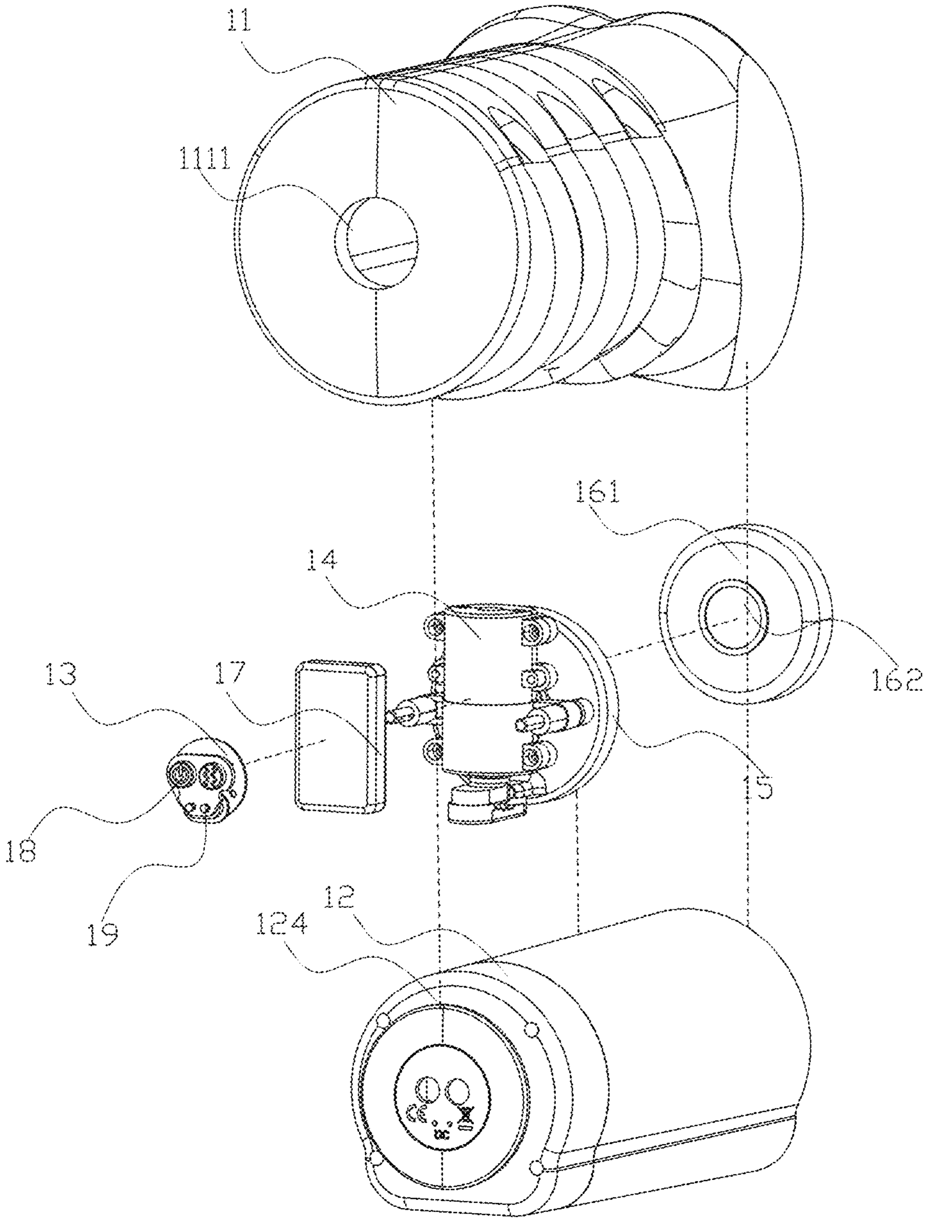
FIG. 3 is a schematic diagram of an explosion structure of a telescopic soft silica gel masturbation cup according to the present invention shown in FIG. 1, including a housing assembly, a support assembly, a transmission assembly and a first magnetic attraction assembly.
Figure 4:
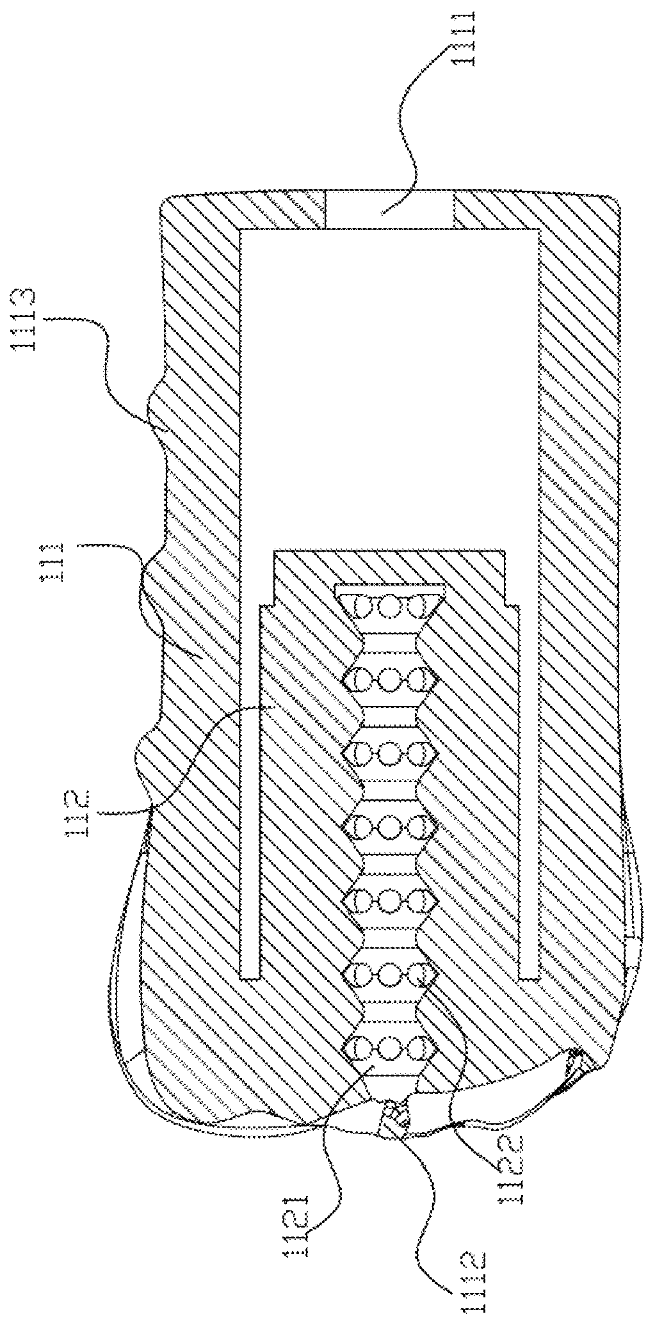
FIG. 4 is a schematic diagram of a cross-sectional structure of a housing assembly shown in FIG. 3.
Figure 5:
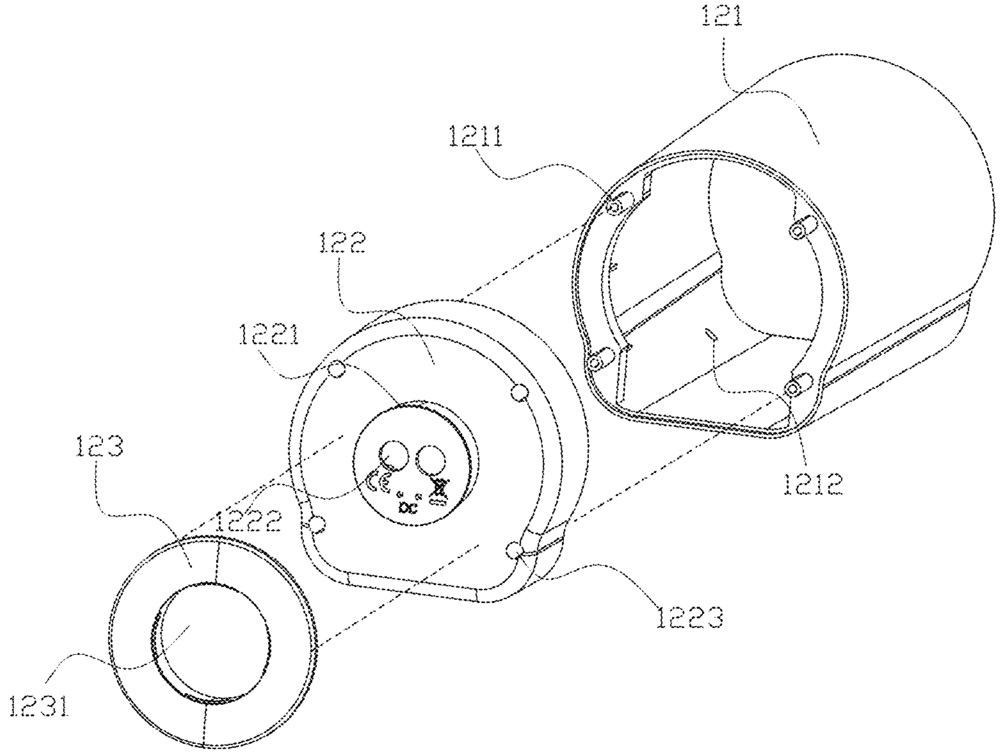
FIG. 5 is a schematic diagram of an explosion structure of a support assembly shown in FIG. 3.
Figure 6:
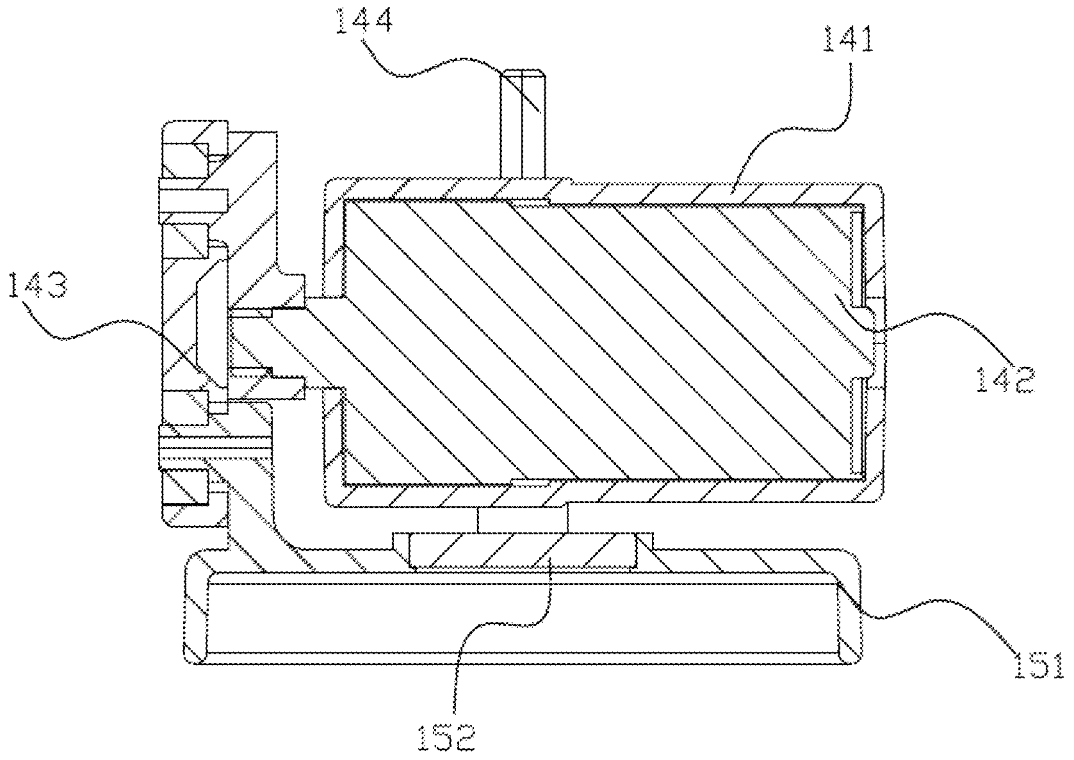
FIG. 6 is a schematic diagram of a connection cross-section between a transmission assembly and a first magnetic attraction assembly shown in FIG. 3.

Referring to FIG. 2, FIG. 3, and FIG. 5, in this embodiment, the support assembly 12 includes a support cavity 121, a cover plate 122, and a clamping plate 123. The support cavity 121 is a hollow cavity with openings at two ends, and the massage body 112 is movably arranged in the support cavity 121 in a penetrating manner; the cover plate 122 is fixedly arranged on one end of the support cavity 121 and is arranged opposite to the massage body 112; and the clamping plate 123 is fixedly arranged on the cover plate 122, a clamping groove 124 is arranged between the clamping plate and the cover plate, and the support assembly 12 is clamped on the first through hole 1111 through the clamping groove 124.

Referring to FIG. 5, specifically, a plurality of fixed columns 1211 are respectively arranged on a side, opposite to the cover plate 122, of the support cavity 121, and the support cavity is fixedly connected to the cover plate 122 through the plurality of fixed columns 1211. A plurality of first fixed holes 1212 are arranged on an inner wall of the support cavity 121 in a penetrating manner, and transmission assembly 14 is fixedly mounted in the support cavity 121 through the plurality of first fixed holes 1212. Specifically, a first connector 1221 is fixedly arranged at one end, opposite to the clamping plate 123, of the cover plate 122, and the clamping plate 123 is fixedly arranged on the first connector 1221, so that the clamping groove 124 is formed between the clamping plate and the cover plate 122. A plurality of third through holes 1222 are arranged on the first connector 1221 in a penetrating manner, and the key assembly 18 and the charging assembly 19 penetrate through the support assembly 12 through a corresponding third through hole 1222, respectively. A plurality of second fixed holes 1223 are arranged on the cover plate 122 in a penetrating manner, and positions of the plurality of second fixed holes 1223 are matched with the positions of corresponding fixed columns 1211, respectively. Fastening screws extend into and are fixed to the fixed columns 1211 through the second fixed holes 1223, so that the cover plate 122 is fixedly connected to the support cavity 121. Specifically, a clamping hole 1231 penetrates through the center of the clamping plate 123 and is fixedly arranged on the first connector 1221.

Referring to FIG. 2, FIG. 3, FIG. 6 and FIG. 7, the transmission assembly 14 includes a fixed housing 141, a drive motor 142, a transmission rod mechanism 143 and at least one guide rod 144. The fixed housing 141 is fixedly arranged in the support cavity 121; the drive motor 142 is arranged in the fixed housing 141 and a rotating shaft of the drive motor penetrates through the fixed housing 141; one end of the transmission rod mechanism 143 is in transmission connection with the rotating shaft of the drive motor 142, the other end of the transmission rod mechanism is in transmission connection with the first magnetic attraction assembly 15, and the drive motor 142 drives the first magnetic attraction assembly 15 to perform reciprocating telescopic movement in the support cavity 121 through the transmission rod mechanism 143; and the at least one guide rod 144 is slidably arranged on an outer side of the fixed housing 141 and is connected to the first magnetic attraction assembly 15, and the guide rod conducts guide operation on the reciprocating telescopic movement of the first magnetic attraction assembly 15. In this embodiment, the two guide rods 144 are slidably arranged on two opposite sides of the fixed housing 141 respectively and are connected to the first magnetic attraction assembly 15.

Figure 7:
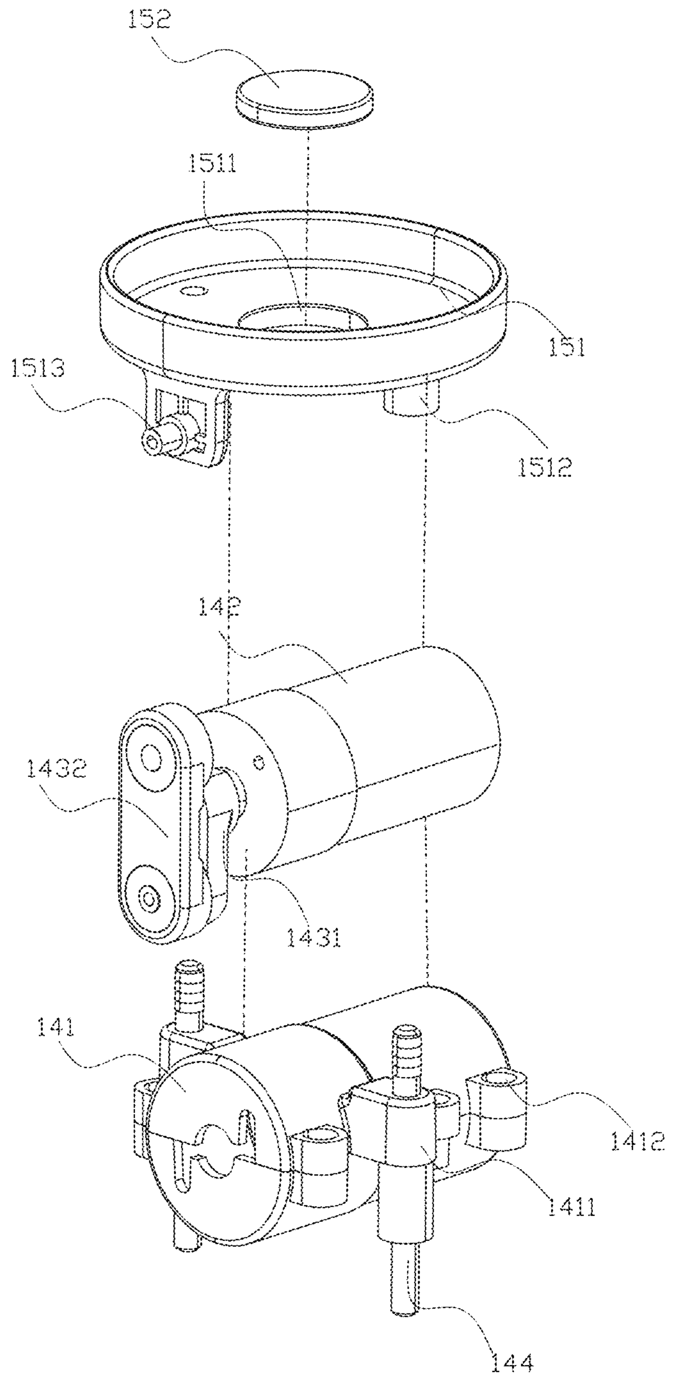
FIG. 7 is a schematic diagram of an explosion structure of a transmission assembly and a first magnetic attraction assembly shown in FIG. 6.

Referring to FIG. 7, specifically, the fixed housing 141 is a hollow cavity, at least one guide sleeve 1411 and a plurality of fixed sleeves 1412 are respectively arranged on the outer side of the fixed housing, the at least one guide rod 144 is slidably arranged in the corresponding guide sleeve 1411 respectively, and the fastening screws extend into and are fixed to the fixed sleeve 1412 through the first fixed holes 1212, so that the fixed housing 141 is fixedly arranged in the support cavity 121. The transmission rod mechanism 143 includes a first transmission rod 1431 and a second transmission rod 1432, one end of the first transmission rod 1431 is in transmission connection with the rotating shaft of the drive motor, the other end of the first transmission rod is in transmission connection with the second transmission rod 1432, and the other end of the second transmission rod 1432 is in transmission connection with the first magnetic attraction assembly 15.

Referring to FIG. 2, FIG. 3, FIG. 6 and FIG. 7, in this embodiment, the first magnetic attraction assembly 15 includes a first magnetic attraction housing 151 and a first magnetic attraction piece 152. The first magnetic attraction housing 151 is in transmission connection with the second transmission rod 1432; and the first magnetic attraction piece 152 is fixedly arranged in the first magnetic attraction housing 151, and is detachably connected to the second magnetic attraction assembly 16 in a magnetic attraction manner. Specifically, a fixed cavity 1511 is arranged in the first magnetic attraction housing 151, and the first magnetic attraction piece 152 is fixedly arranged in the fixed cavity 1511; a connecting hole 1512 is arranged on a side, opposite to the guide rod 144, of the first magnetic attraction housing 151, and one end of the guide rod 144 is fixedly connected into the connecting hole 1512 in a threaded manner; and a side edge of the first magnetic attraction housing 151 is provided with a second connector 1513, and the second transmission rod 1432 is in transmission connection with the second connector 1513, so that the first magnetic attraction housing 151 is driven to perform reciprocating telescopic movement in the support cavity 121. Preferably, the first magnetic attraction piece 152 is a strong magnet.

Referring to FIG. 2 and FIG. 3, in this embodiment, the second magnetic attraction assembly 16 includes a second magnetic attraction housing 161 and a second magnetic attraction body 162. The second magnetic attraction housing 161 is fixedly connected to one end of the massage body 112; and the second magnetic attraction body 162 is fixedly arranged in the second magnetic attraction housing 161, and is detachably connected to the first magnetic attraction piece 152 in a magnetic attraction manner. Preferably, the second magnetic attraction body 162 is a strong magnet, thereby increasing the magnetic attraction force between the second magnetic attraction body and the first magnetic attraction piece 152. Specifically, the battery assembly 17 adopts a polymer lithium ion battery; the key assembly 18 includes a switch key and a function key, the switch key controls the opening and closing of the telescopic soft silica gel masturbation cup 10, and the function key sets the function of the telescopic soft silica gel masturbation cup 10; and the charging assembly 19 may adopt one or more of a DC charging interface, a Type C charging interface, a Micro USB charging interface, and a Lightning charging interface, and in this embodiment, the charging assembly 19 adopts the DC charging interface.

It should be noted that a specific working process of the telescopic soft silica gel masturbation cup 10 provided by the present invention is that: when the male genital organ extends into the massage body 112 through the second through hole 1112, the outer housing 111 is held by a hand, and a proper massage mode is selected through the key assembly 18, so that the drive motor 142 starts to work. The drive motor 142 sequentially passes through the transmission rod mechanism 143, the first magnetic attraction assembly 15 and the second magnetic attraction assembly 16 to drive the massage body 112 to perform reciprocating telescopic movement in the support cavity 121, so as to perform massage operation on the male genital organ through the plurality of massage pieces 1122 arranged in the massage body 112.

The technical features of the above embodiments can be combined in any way. To simplify the description, not all possible combinations of the technical features in the embodiments are described. However, as long as there is no contradiction in the combinations of these technical features, all possible combinations should be considered to fall within the scope of the specification.

The above embodiments only represent several implementation manners of the present invention, and the description thereof is relatively specific and detailed but should not be construed as limiting the scope of the present invention. It should be noted that for those of ordinary skill in the art, several modifications and improvements can be made without departing from the concept of the present invention and these modifications and improvements should all fall within the protection scope of the present invention. Therefore, the protection scope of the present invention shall be subject to the appended claims.

What is claimed is:

1. A telescopic soft silica gel masturbation cup, comprising:

a housing assembly made of a soft silica gel material, wherein the housing assembly comprises an outer housing and a massage body which are integrally formed, the outer housing is a hollow cavity, and the massage body is rod-shaped with a hollow cavity and is arranged in the outer housing;

a support assembly detachably arranged in the housing assembly, wherein the massage body is movably arranged in the support assembly in a penetrating manner;

a transmission assembly arranged in the support assembly;

a first magnetic attraction assembly in transmission connection with the transmission assembly, wherein the transmission assembly drives the first magnetic attraction assembly to perform reciprocating telescopic movement in the support assembly; and a second magnetic attraction assembly fixedly connected to the massage body and detachably connected to the first magnetic attraction assembly in a magnetic attraction manner, wherein the transmission assembly drives the massage body to perform reciprocating telescopic movement in the support assembly, sequentially through the first magnetic attraction assembly and the second magnetic attraction assembly.

2. The telescopic soft silica gel masturbation cup according to claim 1, wherein two opposite ends of the outer housing are respectively provided with a first through hole and a second through hole in a penetrating manner, the support assembly is mounted in the outer housing through the first through hole, and the second through hole is in communication with the massage body.

3. The telescopic soft silica gel masturbation cup according to claim 2, wherein an outer side of the outer housing is provided with a plurality of convex ribs, and the plurality of convex ribs and the outer housing are integrally formed.

4. The telescopic soft silica gel masturbation cup according to claim 2, wherein an accommodating cavity is arranged in the massage body, and the accommodating cavity is in communication with the second through hole; and a plurality of massage pieces are arranged on an inner wall of the accommodating cavity.

5. The telescopic soft silica gel masturbation cup according to claim 4, wherein the plurality of massage pieces and the massage body are integrally formed; and the massage pieces are convex points or spiral strips.

6. The telescopic soft silica gel masturbation cup according to claim 2, wherein a shape of the outer housing and the second through hole on the same side is a buttock shape.

7. The telescopic soft silica gel masturbation cup according to claim 1, wherein the support assembly comprises a support cavity, the support cavity is a hollow cavity with openings at two ends, and the massage body is movably arranged in the support cavity in a penetrating manner; a cover plate fixedly arranged on the support cavity, and the cover plate is arranged opposite to the massage body; and a clamping plate fixedly arranged on the cover plate, and a clamping groove is arranged between the cover plate and the clamping plate.

8. The telescopic soft silica gel masturbation cup according to claim 7, wherein a plurality of fixed columns are respectively arranged on a side, opposite to the cover plate, of the support cavity; and a plurality of second fixed holes are arranged on the cover plate in a penetrating manner, and positions of the plurality of second fixed holes are matched with the positions of corresponding fixed columns, respectively.

9. The telescopic soft silica gel masturbation cup according to claim 7, wherein a first connector is fixedly arranged at one end, opposite to the clamping plate, of the cover plate; and a clamping hole penetrates through the clamping plate, and the clamping hole is fixedly arranged on the first connector.

10. The telescopic soft silica gel masturbation cup according to claim 7, wherein the transmission assembly comprises a fixed housing, and the fixed housing is fixedly arranged in the support cavity; a drive motor arranged in the fixed housing, and a rotating shaft of the drive motor penetrates through the fixed housing; a transmission rod mechanism in transmission connection with the rotating shaft of the drive motor, and the transmission rod mechanism is in transmission connection with the first magnetic attraction assembly; and at least one guide rod slidably arranged on an outer side of the fixed housing and connected to the first magnetic attraction assembly, and the guide rod conducts guide operation on the reciprocating telescopic movement of the first magnetic attraction assembly.

11. The telescopic soft silica gel masturbation cup according to claim 10, wherein the fixed housing is a hollow cavity, at least one guide sleeve is arranged on the outer side of the fixed housing, and the at least one guide rod is slidably arranged in the corresponding guide sleeve, respectively.

12. The telescopic soft silica gel masturbation cup according to claim 10, wherein the transmission rod mechanism comprises a first transmission rod and a second transmission rod which are in transmission connection; one end of the first transmission rod is in transmission connection with the rotating shaft of the drive motor; and the second transmission rod is in transmission connection with the first magnetic attraction assembly.

13. The telescopic soft silica gel masturbation cup according to claim 12, wherein the first magnetic attraction assembly comprises a first magnetic attraction housing, and the first magnetic attraction housing is in transmission connection with the second transmission rod; and a first magnetic attraction piece fixedly arranged in the first magnetic attraction housing, and the first magnetic attraction piece is detachably connected to the second magnetic attraction assembly in a magnetic attraction manner.

14. The telescopic soft silica gel masturbation cup according to claim 13, wherein a connecting hole is arranged on a side, opposite to the guide rod, of the first magnetic attraction housing, and one end of the guide rod is fixedly connected into the connecting hole in a threaded manner.

15. The telescopic soft silica gel masturbation cup according to claim 13, wherein a side edge of the first magnetic attraction housing is provided with a second connector, and the second transmission rod is in transmission connection with the second connector.

16. The telescopic soft silica gel masturbation cup according to claim 13, wherein the second magnetic attraction assembly comprises a second magnetic attraction housing, and the second magnetic attraction housing is fixedly connected to one end of the massage body; and a second magnetic attraction body fixedly arranged in the second magnetic attraction housing, and the second magnetic attraction body is detachably connected to the first magnetic attraction piece in a magnetic attraction manner.

17. The telescopic soft silica gel masturbation cup according to claim 16, wherein both the first magnetic attraction piece and the second magnetic attraction body are strong magnets.

18. The telescopic soft silica gel masturbation cup according to claim 1, further comprising a circuit board, a battery assembly, a key assembly and a charging assembly, wherein the circuit board and the battery assembly are fixedly arranged in the support assembly, respectively, and the circuit board is electrically connected to the transmission assembly, the battery assembly, the key assembly and the charging assembly, respectively; and the key assembly and the charging assembly are respectively arranged on the circuit board and respectively penetrate through the support assembly.

19. The telescopic soft silica gel masturbation cup according to claim 18, wherein the battery assembly adopts a polymer lithium ion battery.

20. The telescopic soft silica gel masturbation cup according to claim 18, wherein the charging assembly adopts one or more of a DC charging interface, a USB C charging interface, a Micro USB charging interface, and a Lightning charging interface.

* * * * *